United States Patent [19]
Macenka et al.

[11] Patent Number: 5,768,040
[45] Date of Patent: Jun. 16, 1998

[54] WIDE FIELD-OF-VIEW IMAGING SPECTROMETER

[75] Inventors: Steven A. Macenka, Altadena; Ulli G. Hartmann, Huntington Beach; Robert E. Haring, Alta Loma; Herbert A. Roeder, Brea, all of Calif.

[73] Assignee: Orbital Sciences Corporation, Dulles, Va.

[21] Appl. No.: 702,854

[22] Filed: Aug. 26, 1996

Related U.S. Application Data

[63] Continuation of Ser. No. 540,232, Oct. 6, 1995, abandoned.
[51] Int. Cl.$^6$ ............................ G02B 17/00; G02B 5/08; G01J 3/28; G01J 3/04
[52] U.S. Cl. ............................ 359/859; 359/570; 356/328
[58] Field of Search .................... 359/859, 861, 359/15, 366, 570; 356/328, 334, 305

[56] References Cited

U.S. PATENT DOCUMENTS

| | | | |
|---|---|---|---|
| 3,112,355 | 11/1963 | Ross | 359/859 |
| 4,037,943 | 7/1977 | Anzai | 359/859 |
| 4,329,050 | 5/1982 | Olsen | 356/305 |
| 4,509,857 | 4/1985 | Vermande | 356/346 |
| 4,519,707 | 5/1985 | Kuffer | 356/326 |
| 4,598,981 | 7/1986 | Hallam et al. | 359/366 |
| 4,634,276 | 1/1987 | Sharpe | 356/305 |
| 4,743,112 | 5/1988 | Burke | 356/326 |
| 5,170,284 | 12/1992 | Cook | 359/861 |
| 5,173,801 | 12/1992 | Cook | 359/861 |
| 5,221,990 | 6/1993 | Cook | 359/399 |
| 5,260,767 | 11/1993 | Cook | 356/326 |
| 5,266,795 | 11/1993 | Vaughan | 250/227 |
| 5,331,470 | 7/1994 | Cook | 359/859 |
| 5,410,434 | 4/1995 | Shafer | 359/859 |
| 5,424,826 | 6/1995 | Kinney | 356/326 |
| 5,471,346 | 11/1995 | Ames | 359/366 |
| 5,517,366 | 5/1996 | Togino | 359/366 |

OTHER PUBLICATIONS

Goetz, A.F.H., et al., *Optical Remote Sensing of the Earth*, Proceedings of the IEEE, Jun. 1985, pp. 950–969.
Goetz, A.F.H., et al., *Imaging Spectrometry for Earth Remote Sensing*, Science, vol. 228, Jun. 7, 1985, p. 1147.

*Primary Examiner*—Jon W. Henry
*Attorney, Agent, or Firm*—Jenner & Block

[57] ABSTRACT

The invention provides an imaging spectrometer that provides a wide field-of-view camera and spectrometer for spectral imaging of a large two-dimensional area of the Earth's surface from an orbiting satellite or airplane. The wide field-of-view camera fore-optics includes spherical optical elements arranged monocentrically. The spectrometer includes an all-reflective coupling design that transfers the curved optical image to one or more compact imaging spectrometers. The spectrometers preferably comprise a spherical convex holographic grating and associated reflective optics for dispersing a collimated optical beam into its spectral components and focusing the spectral image onto a planar detector array. The instrument described herein is designed to operate in a "pushbroom" fashion, that is, the forward motion of the satellite or airplane generates the spatial dimension of the resulting image. Because of its compact optical design and because no additional scanning equipment is required to scan the Earth's surface, the instrument is very compact and light-weight.

38 Claims, 4 Drawing Sheets

WIDE FIELD-OF-VIEW IMAGING SPECTROMETER

This application is a continuation of application Ser. No. 08/540,232, filed Oct. 6, 1995 now abandoned.

FIELD OF THE INVENTION

The invention relates to imaging spectrometer devices, and in particular to a wide field-of-view imaging spectrometer that provides spectral images of the Earth's surface from an orbiting satellite or an airplane.

BACKGROUND OF THE INVENTION

For many years, scientists have known that plant life, mineral components and other objects on the Earth's surface radiate and reflect energy in characteristic spectra. As a result, spectral images of a target area on the Earth's surface provide important information concerning the existing life forms and other matter at the target area, which is useful for environmental, agricultural and military studies, to name but a few. For this purpose, imaging spectrometers have been deployed on orbiting satellites and airplanes to measure radiation from the surface of the Earth in narrow wavelength bands.

Imaging spectrometers capture energy radiated from the Earth's surface, disperse the energy beam into its constituent spectral bands and measure the intensity of radiation in each spectral interval. First, a spectrometer uses fore-optics, such as a camera or telescope, to focus the spatial image of the two-dimensional target scene on the Earth (called its "field of view") onto a slit. A dispersing device, such as a diffraction grating or prism, then disperses the spatial image into a spectral image, which is focused onto a focal plane. At the focal plane, an array of detector elements, such as photomultipliers or charge coupled devices, together produce an output signal representing the detected spectrum over the entire field of view. Although many spectrometers produce spectral images of a target area only in the visible range, useful information also exists in spectral ranges from ultra-violet to infrared.

Typically, the camera fore-optics of imaging spectrometers now deployed on space vehicles or airplanes achieve only a limited field of view and, thus, cover only a limited target area on the Earth's surface. To ensure broader area coverage, such instruments must use scanning mechanisms involving motors and associated actuators. Scanning mechanisms increase the complexity, weight and power consumption of the instrument, which limits its reliability and life span and greatly increases the cost of its deployment. In particular, traditional scanning mechanisms:

1) reduce signal integration time (and therefore signal-to-noise-ratio ("SNR")) because not all pixels are being imaged at the same time;
2) produce errors in co-registration of scene elements due to mechanism point errors ("scan step reproducibility");
3) can be a source of uncompensated angular momentum input to the spacecraft; and
4) must be lubricated with materials that can be a source of contamination or degradation in optical systems— particularly in the UV region of the spectrum.

Significantly, because of the reduction in signal integration time, devices with scanning mechanisms must be larger and heavier to obtain the same SNR, even without considering the size and weight added by the scanning mechanism itself. Such factors are of crucial importance in spacecraft applications where payload space and weight are at a premium.

In an attempt to overcome these shortcomings, imaging spectrometers have been designed that operate on a "pushbroom" principle. In a pushbroom device, the forward motion of the vehicle (i.e., the airplane or satellite) generates the spatial dimension (or "raster") of the target area image, while the width of the image (also known as the "swath") is set by the field of view of the spectrometer and by the width of the detector array. Although pushbroom operation can result in a savings of instrument size and weight, typical camera fore-optics achieve a limited field of view, making large scene coverage via pushbroom operation impractical. Moreover, prior attempts to design wide field of view entrance optics for pushbroom spectrometers have used refractive rather than reflective optical elements. Refractive systems suffer from chromatic aberrations that are not produced by all-reflective optics.

Therefore, there is a need for an imaging spectrometer that is capable of wide area coverage and that is compact, light-weight and includes no moving parts. There is also a need for an improved camera fore-optics design that uses reflective optics and yields a wide field of view for use in satellite or aerial photography of the Earth's surface.

SUMMARY OF THE INVENTION

The imaging spectrometer according to the present invention overcomes the above-described limitations in prior imaging spectrometers. Specifically, the imaging spectrometer described herein includes a light-weight, compact fore-optics camera that provides a wide field of view without mechanical scanners. In addition, the instrument includes an improved all-reflective coupling design that transfers the fore-optics spatial image to an efficient spectral resolving device. Because the instrument operates on a pushbroom principle, no additional scanning equipment is required to scan the Earth's surface.

In accordance with the present invention, the improved imaging spectrometer includes a fore-optics camera having reflective spherical concentric mirrors that achieves a field of view of 120° or more to provide essentially horizon-to-horizon coverage from a low Earth orbiting satellite. The fore-optics camera produces a curved spatial image which can be coupled to a spatial resolving system for producing a two-dimensional spectral image. This monocentric fore-optics design is compact and, because only allreflective optics are employed, the spectrometer can be used over a wide range of wavelengths, from the far ultra-violet to the long wave infrared.

In a preferred embodiment, the camera fore-optics includes a primary convex spherical mirror that reflects incoming radiation from a distant object to a secondary concave mirror. The secondary mirror focuses the radiation onto an image surface through an aperture stop. The aperture stop is located at the common center of curvature of the primary and secondary mirrors. Despite its low mass, this camera design achieves an aperture of f/3.5 or faster, while maintaining an image spot size of no more than 30 micrometers. The curvature, spacing, and size (or area) of the optical elements will determine the fastest speed attainable by the system.

The curved image produced by the fore-optics is coupled to one or more miniature spectrometers, each receiving a portion of the field of view. Each spectrometer may include a spherical holographic grating and associated reflective optics. The holographic grating disperses the curved spatial image into its spectral components and spherical mirrors focus the spectral image onto a planar image surface. A suitable detector array located at the planar image surface produces output signals corresponding to the spectral image of the target scene. Alternatively, the spatial image from the camera fore-optics can be transmitted to a spectrometer device by optical waveguides or a planar fiber optic bundle.

The imaging spectrometer described herein can be constructed in a package no larger than a typical breadbox and weighing as little as 2 kg. Because of this compact design, the spectrometer can be inexpensively installed on low-Earth orbiting satellites for imaging large portions of the Earth's surface. In addition, the lack of moving parts reduces instrument cost and risk (along with size and weight) adding to the instrument's facility in spacecraft applications.

Other objects and features of the invention will be apparent from the following description and from the drawings.

DETAILED DESCRIPTION OF THE INVENTION

Figure 1:
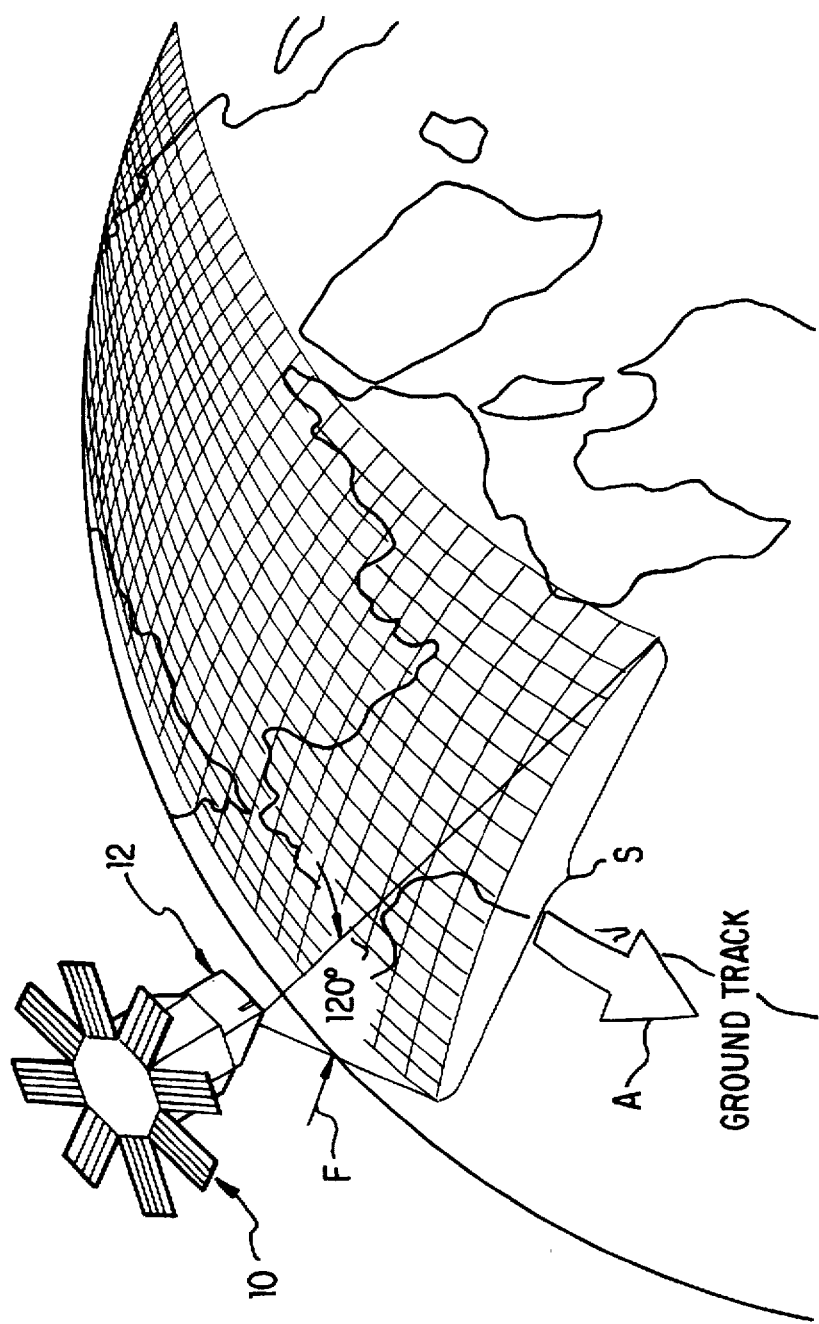
FIG. 1 is a pictorial representation of the Earth being scanned from a satellite having an imaging spectrometer according to the present invention.

Illustrated in FIG. 1 is a pictorial representation of a satellite 10 equipped with an imaging spectrometer 12 of the kind described herein for producing spectral images of the Earth's surface. In the illustrated example, as satellite 10 orbits the Earth in the direction indicated by arrow A, spectrometer 12 optically scans a target area of the Earth's surface in the cross track (indicated by swath S). The width of swath S is defined by the instrument's field of view F. The optical design of instrument 12, as described below, permits a broad 120° field of view F, which allows the instrument to scan the entire Earth's surface at 1 to 2 km ground sample distance from a polar orbit of 700 km using available detector arrays.

Figure 2A:
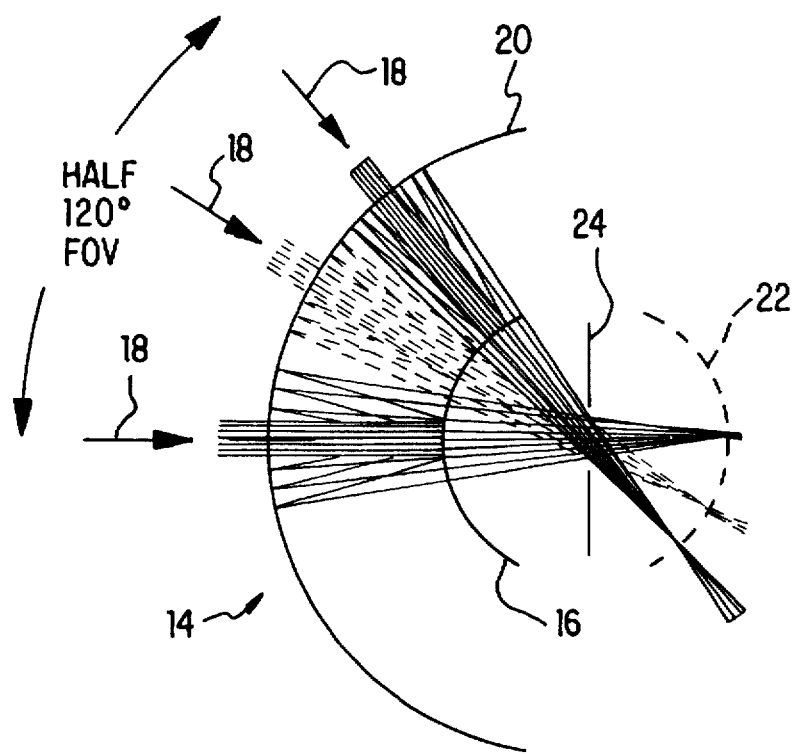
FIG. 2A is a sectional view of the camera fore-optics of the imaging spectrometer taken along a plane parallel to the instrument's field of view.
Figure 2B:
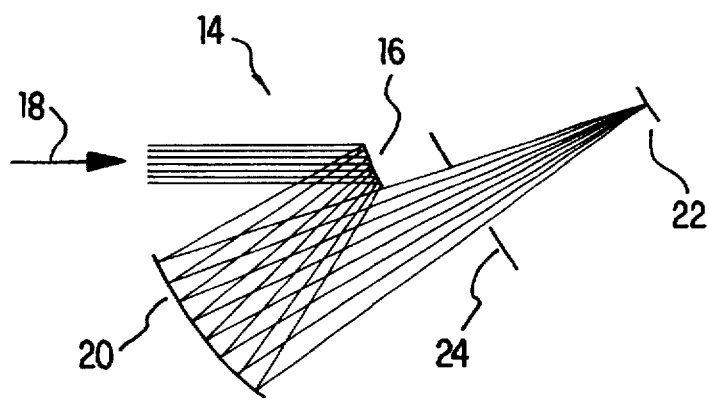
FIG. 2B is a sectional view of the camera fore-optics taken along a plane perpendicular to the instrument's field of view.
Figure 3:
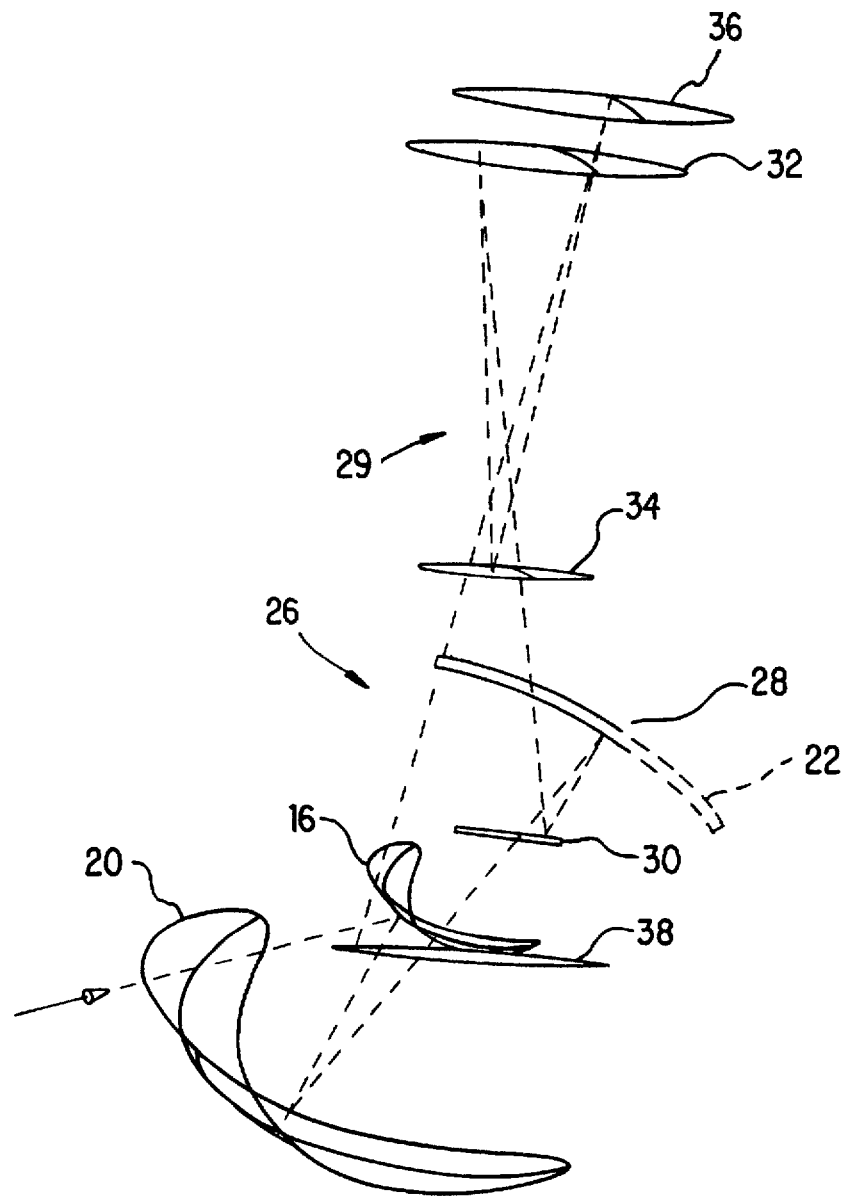
FIG. 3 is a schematic representation and optical ray path for the miniature imaging spectrometer and coupling device of the present invention.

In operation, as spectrometer 12 scans the target area S, incoming radiation from the target S is focused as a spatial image by a camera fore-optics (FIGS. 2A and 2B) and, subsequently, the spatial image is divided into its spectral components and focused onto a detector array at an image plane (FIG. 3). The detector array produces a two-dimensional output signal with the spatial scene on one axis and the spectral components of the scene on the other.

Satellite 10 and instrument 12 operate on what is called a "pushbroom" principle. That is, the forward motion of satellite 10 in direction A generates the spatial dimension of the spectral images produced by spectrometer 12 over the entire field of view F. Pushbroom operation allows for the maximum integration time at the detector array for each finite element of the scene (i.e., for each pixel), resulting in maximum signal level, and hence signal-to-noise ratio ("SNR"), at even very small optical apertures. Moreover, with pushbroom operation, spectrometer 12 does not need mechanical scanning equipment to scan the Earth's surface in ground track direction A, resulting in a significant cost and weight savings. Further, because the unique design of imaging spectrometer 12 permits a very wide field of view F, mechanical scanners are not required to scan in the cross-track direction.

According to the present invention, as illustrated in the orthogonal views of FIGS. 2A and 2B, imaging spectrometer 12 includes unique fore-optics camera 14 having a plurality of concentric spherical mirrors to achieve high optical performance in a compact, light-weight package. Essentially, fore-optics 14 is an off-axis, monocentric, three-element all-reflective camera. A primary spherical convex mirror 16 reflects incoming light rays or other radiation from distant objects (indicated by arrows 18) from the target area on the Earth and reflects rays 18 to a secondary concave spherical mirror 20. Secondary mirror 20 focuses rays 18 to a curved image surface 22 through an aperture stop 24 located at the center of curvature of both primary mirror 16 and secondary mirror 20.

Preferably, the distance between primary mirror 16 and secondary mirror 20 reference spheres is equal to the difference between the radius of curvature of the two mirrors. However, it is essential that the functional surfaces in the direction perpendicular to the 120° field of view F direction do not obscure the optical path. Therefore, the WFIS fore-optics camera is an off-axis, unobscured optical system. The use of spherical reflective surfaces arranged monocentrically results in a very compact instrument design and greatly simplifies the mounting and alignment of the optics, as well as making them cheaper to fabricate. In addition, the use of reflective elements permits camera fore-optics system 14 to be employed over a wide range of wavelengths.

In the illustrated embodiment, fore-optics 14 has a focal ratio of f/3.5 with a focal length of 18.5 mm. Ray trace studies indicate that a focal ratio as fast as f/1.8 can be achieved while maintaining a very compact spot image size of 30 micrometers or less over the entire 120° field of view. Increasing the size of the primary and secondary mirrors increases the aperture or speed of the system until the mirrors reach a maximum size limit beyond which the optical beam would be obstructed. The size and mounting structure of the mirrors limit the maximum aperture that can be accommodated before the optical path becomes obstructed, and will therefore limit the minimum focal ratio that camera 14 can achieve.

As shown in FIG. 3, camera fore-optics 14 is coupled via coupling 26 to a spectral resolving system 29, which diffracts the optical image at surface 22 into its constituent spectral image and focuses the spectral image onto a detector system (not shown) at spectral image surface 38 measurement. It should be noted that although the illustrated embodiment shows camera fore-optics 14 coupled to a spectral resolving system for imaging spectrometry, fore-optics 14 can also be used in a variety of other applications, for example, as a camera system for conventional film photography of the Earth's surface.

The spatial image at surface 22 is coupled to a pair of identical miniature imaging spectrometers 29 via an optical coupling 26 (note that the second spectrometer is omitted from FIG. 3 for clarity). Coupling 26 comprises a two-segment spherical concave reflective slit 28 located near, but not exactly coincident with, camera imaging surface 22, which reflects the spatial image onto a pair of plano folding mirrors 30 (only one being illustrated in FIG. 3). The two segment slits and the fold mirrors provide the necessary separation of the optical paths for the two mini-spectrometers in the example system. Folding mirrors 30 divide the field of view into two equal parts, that is, 60° of the entire 120° field of view are directed to the first imaging spectrometer 29 and 60° of the field of view are directed to a second imaging spectrometer (not shown).

As shown in FIG. 3, one-half of the 120° field of view is reflected by folding mirror 30 to concave mirror 32. Mirror 32 collimates the optical beam and directs it onto the surface of a convex holographic grating 34 where the beam is diffracted (spectrally dispersed). The dispersion axis of grating 34 is orthogonal to the cross-track direction of the orbiting satellite or airplane. Preferably, grating 34 is an 1818 groove per millimeter holographic grating for a spectrometer with a spectral range of 300 nanometers to 400 nanometers. Grating 34 diffracts the incoming spatial image into its spectral components and reflects the resulting spectral image to a mirror 36. Mirror 36 forms a two-dimensional planar spectral image, one-half of the spatial image on one axis and its spectral components (or wavelength) on the other. This image is reflected by mirror 36 onto spectral image surface 38, where an array of optically sensitive elements of the kind well known in the art can be positioned. Preferably, a 1024×1024 CCD detector array with 50 micrometer or smaller pixels can be located at image surface 38 for measuring the spectral image. Such detectors are commercially available from, for example, Kodak under model designation KAF-1000 or from Reticon under model designation RA1024J, or a 2048×2048 detector can be obtained from Loral under model designation CCD422.

Optical ray trace studies confirm that imaging spectrometer system 12 achieves superior optical performance. For example, the imaging quality of the fore-optics camera permits a spectral resolution of 0.1 nm over a contiguous spectral range of 300–400 nm when coupled to spectrometer optics 29 which images (with<1 pixel spot size) a 100 nm wide spectrum onto a detector with 1000 or more elements in the spectral direction. Moreover, when imaged onto the 1024×1024 detector array (not shown) at image surface 38, the instrument's 120° field of view achieves a 7 arc-minute instantaneous (along track) field of view resulting in a 1.4 km ground sample distance (at nadir) in a 705 km polar orbit. Table I below lists a comparison of the physical parameters of imaging spectrometer system 12 of FIGS. 2A,2B, and 3, as compared to the optical system of the Total Ozone Mapping Spectrometer ("TOMS") instrument currently deployed.

TABLE I

| Parameter | TOMS | WFIS |
|---|---|---|
| Spectral Range | 308.6–360.0 nm | 300–400 nm |
| Spectral Resolution | 1.0 nm | 0.5 nm |
| Field of View | 111° Cross Track | 120° Cross Track |
| IFOV | 3 degrees | 7 arc-min |
| Orbit | 797–955 km Polar, Sun Synchronous | 705 km Polar, Sun Synchronous |
| Footprint | 50 km (Nadir) | 1.4 km (Nadir) |
| Swath | 2750 km | 3139 km |
| Coverage at Equator | 100% | 114% |
| Detector | 1 PMT | 1024 × 1024 Array |
| Aperture | 0.33 cm sq. | 0.5 cm sq. |
| Optics Speed | f/5.0 | f/3.5 |
| Size | 40 × 38 × 58 cm | 15 × 15 × 15 cm |
| Weight | 34 kg | <2 kg |

Moreover, Table II below shows the exact arrangement of the optical elements of the imaging system employed in ray trace studies. The coordinate system and sign conventions for the data appearing in Table II are consistent with general optical ray trace program conventions, and specifically those described in the CODE V reference manual of the Optical Research Associates Corporation, Pasadena, Calif.

TABLE II

OPTICAL PRECRIPTION: Wide Field Imaging Spectrometer (WFIS)

| Surface # | Optical Element | Radius mm | Thickness[c] mm | Glass | Decenter X[d] mm | Decenter Y mm | Tilt A[b] Degrees | Tile B Degrees |
|---|---|---|---|---|---|---|---|---|
| object | (g) | infinity | infinity | | | | | |
| 1 | (g) | infinity | -66.6312 | | | 8 | | |
| 2 | (g) | infinity | 45.666264 | | | | | |
| 3 | primary | 20.96494 | -31.316462 | reflective | | | | |
| 4 | secondary | 52.2814 | 52.2814 | reflective | | | | |
| 5 | (h) | infinity | 17.4586 | | | | | -30 |
| 6 | slit | -36.65786 | 0 | reflective | | | | |
| 7 | (g) | infinity | -16.5 | | | | 27.26668 | |
| 8 | fold[e] | infinity | 0 | reflective | | | 31.36666 | -10 |
| 9 | (g) | infinity | 93.33768 | | | | | |
| 10 | colliminating | -108.70965 | -49.661223 | reflective | 23.1 | -24.799399 | | |
| 11 | grating[a],[f] | -59.35723 | 54.84497 | reflective | -0.527563 | 0.095291 | | |
| 12 | focusing | -114.17389 | -111.45952 | reflective | | | 0.051204 | |
| image | (f) | | | | | | 0.565974 | -1.939872 | notes:
[a]Grating order 1, period .000550 mm -along Y axis. The system aperture stop is at this surface.
[b]Tilt A is positive left hand about the X axis, tilt B is positive left hand about Y axis.
[c]Thickness, the distance to the next surface, is measured along the Z axis.
[d]The effects of decenters and tilts are cumulative.
[e]This is a Code V BEN surface i.e., tilt angles are applied again after reflection and the axis is recomputed.

TABLE II-continued

OPTICAL PRECRIPTION: Wide Field Imaging Spectrometer (WFIS)

| Surface # | Optical Element | Radius mm | Thickness[c] mm | Glass | Decenter X[d] mm | Decenter Y mm | Tilt A[b] Degrees | Tile B Degrees |
|---|---|---|---|---|---|---|---|---|

[f]This is a Code V DAR surface i.e., coordinate decenter and return.
[g]Computer model dummy or reference surface such as axis tilt or decenter location.
[h]Reference surface indicating aperture stop location in the camera.

Figure 4:
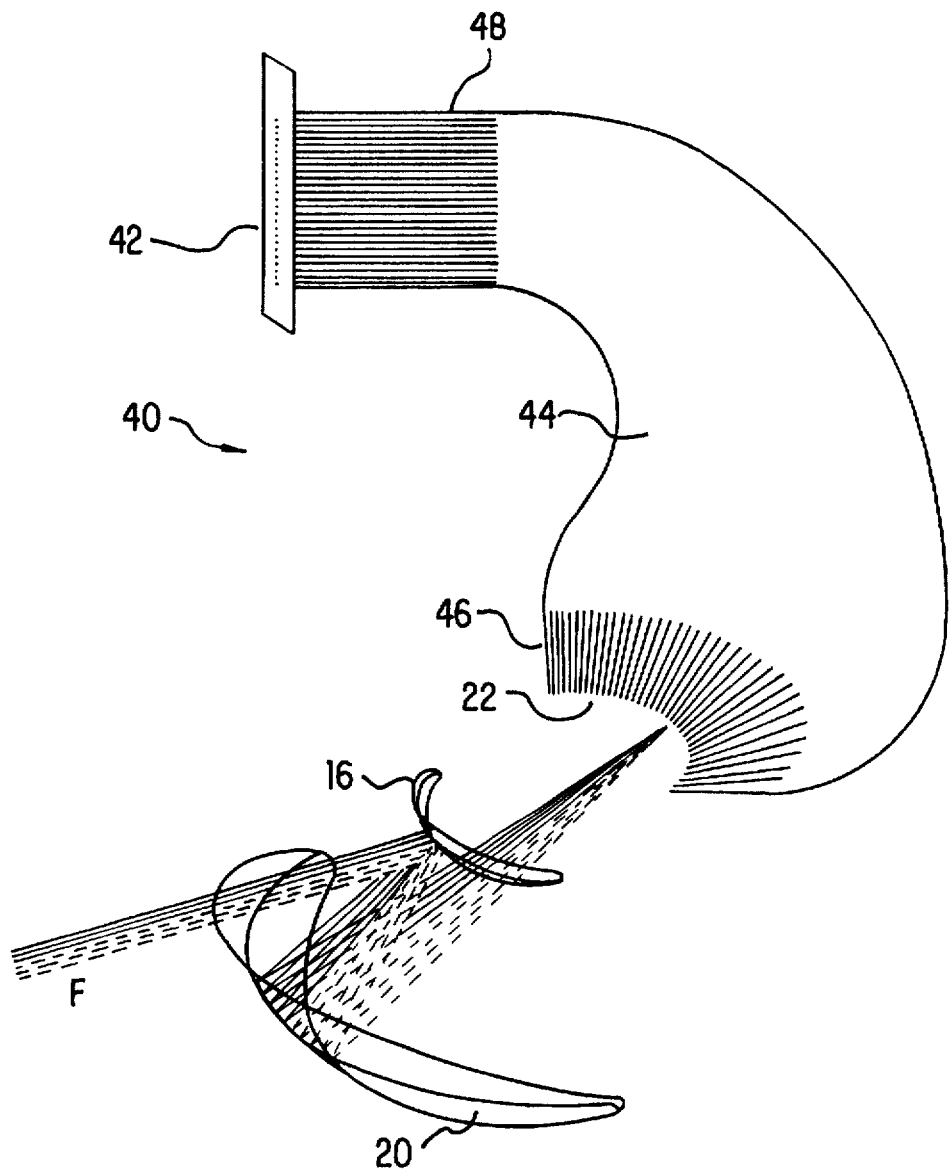
FIG. 4 illustrates an alternative coupling design for the imaging spectrometer of the present invention.

An alternative coupling system 40 is illustrated in FIG. 4. Coupling system 40 comprises a coherent bundle of optical conduits 44, which could be, for example, optical fibers or optical waveguides. Bundle 44 has individual elements oriented so that they receive the curved image at image surface 22 and relay the image to a planar image surface 42.

The fiber bundle 44 can be made using silica fibers with diameters as small as 25 microns. Fiber bundle 44 is terminated at focal surface 22 and planar image surface 42 by fiber terminations 46 and 48. The required orientation of the individual optical fibers at focal surface 22 may be achieved with a silicon clamp (not shown) comprising two silicon wafers holding the fibers between them. Each wafer would preferably have the required pattern etched onto its surface by standard IC wafer processing techniques to form individual channels for each of the optical fibers. The fiber terminations 46 and 48 may be accurately ground and polished to the required surface figure using standard optical fabrication techniques.

In conjunction with fore-optics 14, coupling system 40 could be used in a variety of applications. For example, planar image surface 42 could be an entrance slit to an imaging spectrometer or monochromator or could be the location of a linear array detector or film in a wide field-of-view camera system. In each application, such an instrument would share the advantages of the all-reflective imaging spectrometer described above. Namely, the instrument would be capable of wide area coverage in a very lightweight and compact package with no moving parts.

A specific embodiment of the invention for use with an imaging spectrometer installed on an orbiting satellite has been described for purposes of illustrating the manner in which the system may be used. It should be understood that implementation of other variations and modifications of the invention and its various aspects will be apparent to those skilled in the art, and that the invention is not limited to the specific embodiments described. It is therefore contemplated to cover by the present invention any and all modifications, variations and equivalents that fall within the true scope and spirit of the basic underlying principles disclosed and claimed herein.

We claim:

1. A wide field-of-view imaging spectrometer comprising:
   fore-optics comprising a plurality of curved concentric reflecting elements forming a curved image at an imaging surface adjacent to said reflecting elements;
   a spectral resolving system for dividing said curved image into a plurality of spectral bands of predetermined wavelengths; and
   coupling means for optically coupling said curved image to said spectral resolving system.

2. The imaging spectrometer of claim 1 wherein the reflective elements of said fore-optics comprise concentric spherical mirrors.

3. The imaging spectrometer of claim 1 wherein the reflective elements of said fore-optics comprise a primary convex spherical mirror and a secondary concave spherical mirror, and wherein the center of curvature of said primary spherical mirror is located at the center of curvature of said secondary spherical mirror.

4. The imaging spectrometer of claim 1 wherein said fore-optics achieves a focal ratio of f/3.5 or less.

5. The imaging spectrometer of claim 1 wherein said coupling means further comprises one or more concave reflecting slits located near the imaging surface of said fore-optics.

6. The imaging spectrometer of claim 5 wherein said spectral resolving system further comprises a plurality of mini-spectrometers and said coupling means further comprises one or more folding mirrors for folding a portion of said image reflected by one of said reflecting slits to one of said mini-spectrometers.

7. The imaging spectrometer of claim 1 wherein said spectral resolving system further comprises means for diffracting said curved image into a spectrum and imaging said spectrum onto a planar image surface.

8. The imaging spectrometer of claim 7 wherein said spectral resolving system further comprises a convex grating and curved reflective elements.

9. The imaging spectrometer of claim 7 wherein said spectral resolving system further comprises a detector array located at said planar image surface for detecting the spectral components of said spectrum.

10. The imaging spectrometer of claim 1 wherein said coupling means comprises a planar optical conduit bundle oriented to receive said curved image from said fore-optics and transmitting said image to a planar image surface.

11. The imaging spectrometer of claim 10 wherein said optical bundle comprises a plurality of optical fibers.

12. The imaging spectrometer of claim 10 wherein said optical bundle further comprises a plurality of optical waveguides.

13. A wide field-of-view optical system comprising:
   a primary convex reflecting element;
   a secondary concave reflecting element concentric with said first reflecting element and located to receive reflected images from said primary convex reflecting element,
   thereby forming a curved image at an imaging surface adjacent to said reflecting elements.

14. The wide field-of-view optical system of claim 13 further comprising a curved photosensitive element located at said imaging surface.

15. The wide field-of-view optical system of claim 13 further comprising optical waveguide means for receiving said curved image at said imaging surface and transmitting said image to a planar imaging surface.

16. The wide field-of-view optical system of claim 13 further comprising all-reflective optical coupling means for receiving said curved image at said imaging surface and transmitting said image to a planar imaging surface.

17. The imaging spectrometer of claim 1 wherein said coupling means are all-reflective.

18. The imaging spectrometer of claim 1 wherein said fore-optics further comprises an aperture stop at the center of curvature of said reflecting elements.

19. The wide field-of-view optical system of claim 13 further comprising optical fibers for receiving said curved image at said imaging surface and transmitting said image to a planar imaging surface.

20. The imaging spectrometer of claim 3 wherein the fore-optic reflecting elements further comprise an aperture stop at the center of curvature of said reflecting elements and said fore-optics achieves a focal ratio of f/3.5 or less.

21. The imaging spectrometer of claim 20 wherein said coupling means further comprises a concave reflecting slit located near the imaging surface of said fore-optics and one or more folding mirrors for folding at least a portion of said image reflected by said reflecting slit to said spectral resolving system.

22. The imaging spectrometer of claim 21 wherein said spectral resolving system further comprises a convex grating, curved reflective elements, and a detector array located at a planar image surface for detecting the spectral components of said spectrum.

23. The wide-field-of-view optical system of claim 13 further comprising an aperture stop at the center of curvature of said primary and secondary reflecting elements.

24. A wide field-of-view imaging spectrometer comprising:

a primary convex spherical mirror for reflecting incoming radiation;

a secondary concave spherical mirror for receiving radiation reflected from said primary mirror;

an aperture stop located at the center of curvature of both said primary mirror and said secondary mirror, wherein said secondary mirror reflects the radiation reflected from said primary mirror through said aperture stop, thereby forming a curved image at an image surface;

one or more spectral resolving systems;

one or more spherical concave reflective slits, each said slit reflecting at least a portion of said curved image into the optical path of one of said spectral resolving systems, wherein each said spectral resolving system further comprises;

a concave mirror for receiving the portion of said image reflected from one of said reflective slits and reflecting a collimated beam of radiation;

a grating which diffracts said beam and reflects the resulting spectral image;

a spectral image mirror for forming a two-dimensional planar spectral image from the spectral image reflected by said grating, said planar spectral image having a spatial image on one axis and its spectral components on another axis; and a spectral image surface having optically sensitive elements, wherein said spectral image mirror reflects said two-dimensional spectral image onto said spectral image surface and said optically sensitive elements respond to said spectral image.

25. The wide field-of-view imaging spectrometer of claim 24 wherein each said spectral resolving system further comprises a folding mirror for reflecting the portion of said image received from one of said reflective slits, and wherein said concave mirror of one of said spectral resolving systems receives the portion of said image reflected from one of said reflective slits from said folding mirror.

26. The wide field-of-view optical system of claims 15, 16, or 19 further comprising spectral resolving means for diffracting said curved image into its spectral components.

27. The imaging spectrometer of claims 2, 3, or 20, wherein said coupling means further comprises one or more concave reflecting slits located near the imaging surface of said fore-optics, each said concave reflecting slit reflecting at least a portion of said curved image into an optical path of said spectral resolving system.

28. The imaging spectrometer of claim 27 wherein said coupling means further comprises one or more folding mirrors for folding the portion of said image reflected by at least one of said reflecting slits to said spectral resolving system.

29. The imaging spectrometer of claims 2, 3, or 20, wherein said spectral resolving system further comprises one or more mini-spectrometers.

30. The imaging spectrometer of claims 2, 3, or 20, wherein said spectral resolving system further comprises means for diffracting said curved image into a spectrum and imaging said spectrum onto a planar image surface.

31. The imaging spectrometer of claim 30 wherein said spectral resolving system further comprises a convex grating and curved reflective elements.

32. The imaging spectrometer of claim 30 wherein said spectral resolving system further comprises a detector array located at said planar image surface for detecting the spectral components of said spectrum.

33. The imaging spectrometer of claims 2, 3, or 20, wherein said coupling means further comprises a planar optical conduit bundle oriented to receive said curved image from said fore-optics and transmitting said image to a planar image surface.

34. The imaging spectrometer of claim 33 wherein said optical bundle further comprises a plurality of optical fibers.

35. The imaging spectrometer of claim 33 wherein said optical bundle further comprises a plurality of optical waveguides.

36. The imaging spectrometer of claim 27 wherein said spectral resolving system further comprises one or more mini-spectrometers, and wherein the portion of said curved image reflected by each said concave reflecting slit is directed into the optical path of one of said mini-spectrometers.

37. The imaging spectrometer of claim 36 wherein said coupling means further comprises one or more folding mirrors and wherein the portion of said curved image reflected by at least one of said concave reflecting slits is directed into the optical path of one of said mini-spectrometers by one or more of said folding mirrors.

38. The imaging spectrometer of claim 37 wherein said one or more folding mirrors further comprise plano folding mirrors.

* * * * *